United States Patent [19]

Birdwell et al.

[11] Patent Number: 5,114,515

[45] Date of Patent: * May 19, 1992

[54] METHOD FOR FORMING POLYMER COMPOSITE FILMS USING REMOVABLE SUBSTRATES

[75] Inventors: Jeffrey D. Birdwell, Lake Jackson; William P. Carl, Angleton, both of Tex.

[73] Assignee: The Dow Chemical Company, Midland, Mich.

[*] Notice: The portion of the term of this patent subsequent to Sep. 9, 2003 has been disclaimed.

[21] Appl. No.: 143,210

[22] Filed: Jan. 11, 1988

Related U.S. Application Data

[63] Continuation of Ser. No. 739,943, May 31, 1985, abandoned.

[51] Int. Cl.⁵ .................. B32B 31/00; B29C 47/00
[52] U.S. Cl. .................... 156/155; 156/231; 156/235; 156/246; 156/247; 156/310
[58] Field of Search .............. 156/308.8, 309.5, 247, 156/332, 143, 210, 231, 235, 246, 249

[56] References Cited

U.S. PATENT DOCUMENTS

| | | | |
|---|---|---|---|
| 3,282,875 | 11/1966 | Connolly et al. | 260/29.6 |
| 3,529,049 | 9/1970 | Abell et al. | 156/247 |
| 3,671,345 | 6/1972 | Barnes et al. | 156/246 |
| 3,692,569 | 9/1972 | Grot | 117/138.8 UF |
| 3,740,369 | 6/1973 | Proskow | 260/30.4 R |
| 3,770,567 | 11/1973 | Grot | 161/189 |
| 3,909,378 | 9/1975 | Walmsley | 204/98 |
| 3,925,135 | 12/1975 | Grot | 156/213 |
| 4,020,204 | 4/1977 | Taylor et al. | 156/247 |
| 4,025,405 | 5/1977 | Dotson et al. | 204/98 |
| 4,065,366 | 12/1977 | Oda et al. | 204/98 |
| 4,112,149 | 9/1978 | Babinsky | 427/34 |
| 4,116,888 | 9/1978 | Ukihashi et al. | 521/31 |
| 4,123,336 | 10/1978 | Seko et al. | 204/98 |
| 4,126,588 | 11/1978 | Ukihashi et al. | 521/31 |
| 4,151,052 | 4/1979 | Goto et al. | 204/95 |
| 4,176,215 | 11/1979 | Molnar et al. | 521/27 |
| 4,178,218 | 12/1979 | Seko | 204/98 |
| 4,192,725 | 3/1980 | Dotson et al. | 204/98 |
| 4,209,635 | 6/1980 | Munekata et al. | 560/183 |
| 4,212,713 | 7/1980 | Suhara et al. | 204/98 |
| 4,251,333 | 2/1981 | Suhara et al. | 204/98 |
| 4,259,226 | 3/1981 | Suhara et al. | 260/33.4 F |
| 4,270,996 | 6/1981 | Suhara et al. | 204/98 |
| 4,298,697 | 11/1981 | Baczek et al. | 521/27 |
| 4,329,435 | 5/1982 | Kimoto et al. | 521/38 |
| 4,330,654 | 5/1982 | Ezzell et al. | 526/243 |
| 4,337,137 | 6/1982 | Ezzell | 204/252 |
| 4,337,211 | 6/1982 | Ezzell et al. | 260/456 F |
| 4,340,680 | 7/1982 | Asawa et al. | 521/27 |
| 4,341,605 | 7/1982 | Solenberger et al. | 204/98 |
| 4,348,310 | 9/1982 | Silva et al. | 524/167 |
| 4,357,218 | 11/1982 | Seko | 204/98 |
| 4,358,412 | 11/1982 | Ezzell et al. | 260/968 |
| 4,358,545 | 11/1982 | Ezzell et al. | 521/27 |
| 4,360,601 | 11/1982 | Copeland et al. | 521/27 |
| 4,386,987 | 6/1983 | Covitch et al. | 156/155 |
| 4,417,969 | 11/1983 | Ezzell et al. | 204/252 |
| 4,421,579 | 12/1983 | Covitch et al. | 156/60 |
| 4,437,951 | 3/1984 | Bissot et al. | 204/98 |
| 4,462,877 | 7/1984 | Ezzell | 204/98 |
| 4,469,579 | 9/1984 | Covitch et al. | 204/283 |
| 4,470,889 | 9/1984 | Ezzell et al. | 204/98 |
| 4,478,695 | 10/1984 | Ezzell et al. | 204/98 |
| 4,545,886 | 10/1985 | de Nora et al. | 204/252 |
| 4,610,762 | 9/1986 | Birdwell | 204/1 R |
| 4,650,551 | 3/1987 | Carl et al. | 204/59 R |
| 4,650,711 | 3/1987 | Carl et al. | 428/265 |
| 4,654,104 | 3/1987 | McIntyre et al. | 156/276 |

FOREIGN PATENT DOCUMENTS

| | | |
|---|---|---|
| 0027009 | 4/1981 | European Pat. Off. . |
| 0066369 | 12/1982 | European Pat. Off. . |
| 0122049 | 10/1984 | European Pat. Off. . |
| 1584426 | 12/1969 | France ............ 156/416 |
| 1286859 | 8/1972 | United Kingdom . |
| 2066824A | 7/1981 | United Kingdom . |
| 2069006A | 8/1981 | United Kingdom . |
| 2101160 | 1/1983 | United Kingdom . |

OTHER PUBLICATIONS

*Chemical Abstract* No. 90:169702z, vol. 90, 1979, "Cation Exchange Membrane".

*J. Paint Tech.*, vol. 41, p. 495, 1969, "Hydrogen Bonding Effects in Non-Electrolyte Solutions".

*Analytical Chem.*, vol. 54, pp. 1639-1641, 1982 "Dissolution of Perfluorinated Ion Containing Polymers".

"Dual Cohesive Energy Densities of Perfluorosulfonic Acid (Nafion) Membrane", Richard S. Yeo, *Polymer*, p. 432, vol. 21, Apr. 1980.

"Solubility Characteristics of Perfluorinated Polymers with Sulfonyl Fluoride Functionality", G. H. McCain and M. J. Covitch, *Journal Electrochemical Society: Electrochemical Science and Technology*, Jun. 1984, pp. 1350-1352.

*Primary Examiner*—Thurman K. Page
*Assistant Examiner*—Peter F. Kulkosky

[57] ABSTRACT

The invention is a method for forming polymer composite films using removable substrates comprising:

(a) forming a first dispersion of a first perfluorinated polymer containing sites convertible to ion exchange groups dispersed in a first dispersant having: a boiling point less than about 110° C.; a density of from about 1.55 to about 2.2; and a solubility parameter of from greater than about 7.1 to about 8.2 hildebrands;

(b) depositing the first dispersion onto a first removable substrate;

(c) removing the first dispersant from the first dispersion, thereby forming a first film;

(d) forming a second dispersion of a second perfluorinated polymer containing sites convertible to ion exchange groups and a second dispersant having: a boiling point less than about 110° C.; a density of from about 1.55 to about 2.2; and a solubility parameter of from greater than about 7.1 to about 8.2 hildebrands;

(e) depositing the second dispersion onto a second removable substrate;

(f) removing the second dispersant from the second dispersion, thereby forming a second film;

(g) bonding the first film to the second film; and
(h) removing the first and the second substrate.

Particularly preferred as a first and as a second dispersant is a compound represented by the general formula:

$$XCF_2-CYZX'$$

wherein:

X is selected from the group consisting of F, Cl, Br, and I;

X' is selected from the group consisting of Cl, Br, and I;

Y and Z are independently selected from the group consisting of H, F, Cl, Br, I and R';

R' is selected from the group of perfluoroalkyl radicals and chloroperfluoroalkyl radicals having from 1 to 6 carbon atoms.

The most preferred first and second dispersant is 1,2-dibromotetrafluoroethane.

15 Claims, No Drawings

METHOD FOR FORMING POLYMER COMPOSITE FILMS USING REMOVABLE SUBSTRATES

This is a continuation of application Ser. No. 739,943 filed May 31, 1985, now abandoned.

The invention is a method for forming polymer composite films using a removable substrate and particularly for forming ion exchange active composite membranes using a removable substrate.

BACKGROUND OF THE INVENTION

Ion exchange active fluoropolymer films have been widely used in industry, particularly as ion exchange membranes in chlor-alkali cells. Such membranes are made from fluorinated polymers having sites convertible to ion exchange active groups on pendant groups from the polymeric backbone.

Such polymers are usually thermoplastic and may be fabricated into films or sheets while in their molten form using mechanical extrusion equipment. However, such equipment is operated in the temperature region near the crystalline melting point of the polymer, which is commonly near the decomposition temperature of some of the polymers. Thus, decomposition may be a problem when some polymers are formed into films by conventional methods. Likewise, it is difficult to make such polymers into films thinner than about 10 microns using such techniques. In addition, it is difficult to make films of consistent thickness. It would be highly desirable to be able to make thin films having a consistent thickness.

Forming membrane structures and support structures into multiple layers is the subject of several patents and applications including U.S. Pat. Nos. 3,925,135; 3,909,378; 3,770,567; and 4,341,605. However, these methods use complicated procedures and equipment including such things as vacuum manifolds, rolls and release media.

Prior art methods for fabricating films from perfluorinated polymers have been limited by the solubility of the polymers and the temperature-dependent viscosity-shear rate behavior of the polymers. To overcome these characteristics of perfluorinated carboxylic ester polymers, workers have tried to swell the polymers using various types of swelling agents and to reduce the fabrication temperatures of the polymers to practical ranges by extraction. Extractions methods have been taught in, for example, U.S. Pat. No. 4,360,601. There, low molecular weight oligomers were removed from carboxylic ester polymers. Polymer "fluff" was extracted in a Soxhlet device at atmospheric pressure for 24 hours (see Examples 1 and 3 of U.S. Pat. No. 4,360,601). Such treatments has been found to make some fluorinated carboxylic ester copolymers more processible and operate more efficiently in a chlor-alkali cell when in a hydrolyzed form. Such extractions modify the fabricated polymer article, for example, by forming grease of the polymer as shown in Example 3 of U.S. Pat. No. 4,360,601.

In addition, such extractions seem to lower processing temperatures of carboxylic ester polymers after isolation. Isolation means separation from the polymerization latex by conventional methods of deactivating the surfactant such as freezing, heating, shearing, salting out or pH adjustment.

British Patent 1,286,859 teaches that highly polar organic "solvents" dissolve small amounts a fluorinated vinyl ether/tetrafluoroethylene copolymer in its thermoplastic form. Thermoplastic form means the polymer is in a form which can be molded or processed above some transition temperature (such as the glass transition temperature or the melting point) without altering its chemical structure or composition. The patent teaches the use of the following materials "solvents": butanol, ethanol, N,N-dimethylacetamide, and N,N-dimethylaniline.

Similar approaches have been used to swell membranes in their ionic forms. Ionic forms of membranes are membranes which have been converted from their thermoplastic form ($-SO_2F$ or $-COOCH_3$) to their ionic forms ($-SO_3M$ or $-COOM$) where M is $H^+$, $K^+$, $Na^+$, or $NH_4^+$ or other metal ion.

Prior art workers have used highly polar solvents or mixtures of solvents on substantially perfluorinated polymers and less polar solvents on fluorinated polymers containing hydrocarbon components as co-monomers, ter-monomers or crosslinking agents.

However, each of the prior art methods for swelling, dispersing or extracting the polymers has certain shortcomings which are known to those practicing the art. Polar solvents have the potential for water absorption or reactivity with the functional groups during subsequent fabrication operations, thus making poor coatings, films, etc. High boiling solvents are difficult to remove and frequently exhibit toxic or flammability properties. Functional form (ionic forms) of the polymers can react with solvents. (See *Analytical Chem.*, 1982, Volume 54, pages 1639–1641).

The more polar of the solvents such as methanol, butanol esters, and ketones as used in U.S. Pat. No. 3,740,369; British Patent 1,286,859; and Chemical Abstracts 90:1697022 have high vapor pressures at ambient conditions, which is desirable for solvent removal; however, they tend to absorb water. Their water content is undesirable because it causes problems in producing continuous coatings and films of hydrophobic polymers. In addition, polar solvents frequently leave residues which are incompatible with the polymers. Also, they frequently leave residues which are reactive during subsequent chemical or thermal operations if they are not subsequently removed.

Another approach taken by the prior art workers to form films from fluoropolymers include the use of high molecular weight "solvents" which have been produced by halogenating vinyl ether monomers. (See British Patent 2,066,824A).

The swelling of the functional (ionic) forms of the fluoropolymers by polar or hydrophilic agents has been known for some time. In addition, the solvent solubility parameters were compared to the swelling effect of 1200 equivalent weight Nafion ion exchange membrane (available from E. I. DuPont Company) by Yeo at Brookhaven Laboratory (see Polymer, 1980, Volume 21, page 432).

The swelling was found to be proportional to two different ranges of the solubility parameter and a calculation was developed for optimizing ratios of solvent mixtures. Ionic forms of functional fluoropolymers may be treated in such a manner, however, the subsequent physical forming or manipulation of the polymers into usable configurations by any thermal operation is limited when the polymers are in the functional forms. In addition, non-ionic forms of polymers treated in this manner are also limited in the thermoplastic processing range by the stability of the functional group bonds.

Other solvation methods have used temperatures near the crystalline melting points of the polymers being solvated, thus requiring either high boiling point "solvents" or high pressure vessels to maintain the system in a solid/liquid state. See *Analytical Chem.*, 1982, Volume 54, pages 1639-1641.

Burrell states the theory of Bagley [J. Paint Tech., Volume 41, page 495 (1969)] predicts a non-crystalline polymer will dissolve in a solvent of similar solubility parameter without chemical similarity, association, or any intermolecular force. However, he fails to mention anything about the solubility of polymers demonstrating crystallinity.

SUMMARY OF THE INVENTION

The invention is a method for forming polymer composite films using removable substrates comprising:

(a) forming a first dispersion of a first perfluorinated polymer containing sites convertible to ion exchange groups and a first dispersant having: a boiling point less than about 110° C.; a density of from about 1.55 to about 2.97 grams per cubic centimeter; and a solubility parameter of from greater than about 7.1 to about 8.2 hildebrands;

(b) depositing the first dispersion onto a first removable substrate;

(c) removing the first dispersion from the first dispersion, thereby forming a first film;

(d) forming a second dispersion of a second perfluorinated polymer containing sites convertible to ion exchange groups and a second dispersant having: a boiling point less than about 110° C.; a density of from about 1.55 to about 2.97 grams per cubic centimeter; and a solubility parameter of from greater than about 7.1 to about 8.2 hildebrands;

(e) depositing the second dispersion onto a second removable substrate;

(f) removing the second dispersant from the second dispersion, thereby forming a second film;

(g) bonding the first film to the second film; and (h) removing the first and the second substrate.

Particularly preferred as a first and as a second dispersant is a compound represented by the general formula:

$$XCF_2\text{—}CYZX'$$

wherein:

X is selected from the group consisting of F, Cl, Br, and I;

X' is selected from the group consisting of Cl, Br, and I;

Y and Z are independently selected from the group consisting of H, F, Cl, Br, I and R';

R' is selected from the group of perfluoroalkyl chloroperfluoroalkyl radicals having from 1 to 6 carbon atoms.

The most preferred first and second dispersant is 1,2-dibromotetrafluoroethane.

DETAILED DESCRIPTION OF THE INVENTION

Dispersion, as used herein, means a composition containing a treating agent and a perfluorinated polymer containing sites convertible to ion exchange groups. The polymer is at least partially dissolved in the dispersant and is dispersed into the dispersant.

The present invention can be used to make ion exchange composite films suitable for use in electrolytic cells, fuel cells and gas or liquid permeation units.

Non-ionic forms of perfluorinated polymers described in the following patents are suitable for use in the present invention: U.S. Pat. Nos. 3,282,875; 3,909,378; 4,025,405; 4,065,366; 4,116,888; 4,123,336; 4,126,588; 4,151,052; 4,176,215; 4,178,218; 4,192,725; 4,209,635; 4,212,713; 4,251,333; 4,270,996; 4,329,435; 4,330,654; 4,337,137; 4,337,211; 4,340,680; 4,357,218; 4,358,412; 4,358,545; 4,417,969; 4,462,877; 4,470,889; and 4,478,695; European Patent Application 0,027,009. These polymers usually have equivalent weights of from about 500 to about 2000.

Particularly preferred for the formation of each layer of the composite films of the present invention are copolymers of monomer I with monomer II (as defined below). Optionally, a third type of monomer may be copolymerized with I and II.

The first type of monomer is represented by the general formula:

$$CF_2=CZZ' \qquad (I)$$

where:

Z and Z' are independently selected from the group consisting of —H, —Cl, —F, or $CF_3$.

The second monomer consists of one or more monomers selected from compounds represented by the general formula:

$$Y\text{—}(CF_2)_a\text{—}(CFR_f)_b\text{—}(CFR'_f)_c\text{—}O\text{—}[CF(CF_2X)\text{—}CF_2\text{—}O]_n\text{—}CF=CF_2 \qquad (II)$$

where:

Y is selected from the group consisting of $-SO_2Z$, —CN, —COZ and $C(R^3_f)(R^4_f)OH$;

Z is I, Br, Cl, F, OR, or $NR_1R_2$;

R is a branched or linear alkyl radical having from 1 to about 10 carbon atoms or an aryl radical;

$R^3_f$ and $R^4_f$ are independently selected from the group consisting of perfluoroalkyl radicals having from 1 to about 10 carbon atoms;

$R_1$ and $R_2$ are independently selected from the group consisting of H, a branched or linear alkyl radical having from 1 to about 10 carbon atoms or an aryl radical;

a is 0-6;

b is 0-6;

c is 0 or 1;

provided a+b+c is not equal to 0;

X is Cl, Br, F or mixtures thereof when n>1;

n is 0 to 6; and $R_f$ and $R'_f$ are independently selected from the group consisting of F, Cl, perfluoroalkyl radicals having from 1 to about 10 carbon atoms and fluorochloroalkyl radicals having from 1 to about 10 carbon atoms.

Particularly preferred is when Y is $-SO_2F$ or $-COOCH_3$; n is 0 or 1; $R_f$ and $R'_f$ are F; X is Cl or F; and a+b+c is 2 or 3.

Although the polymers of each layer can have the same or different radicals for Y, the most preferred composite polymer is one where the polymer of one layer has Y as $-SO_2F$ and the polymer of the other layer has Y as $-COOCH_3$.

By composite films we mean film composed of two or more different polymers. These polymers may differ by type or concentration of sites convertible to ion exchange group. These different polymers are disposed in layers parallel to the film surface.

The third and optional monomer suitable is one or more monomers selected from the compounds represented by the general formula:

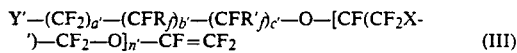

where:
Y' is F, Cl or Br;
a' and b' are independently 0-3;
c' is 0 or 1;
provided a'+b'+c' is not equal to 0;
n' is 0-6;
$R_f$ and $R'_f$ are independently selected from the group consisting of Br, Cl, F, perfluoroalkyl radicals having from about 1 to about 10 carbon atoms, and chloroperfluoroalkyl radicals having from about 1 to about 10 carbon atoms; and
X' is F, Cl, Br, or mixtures thereof when n'>1.

Conversion of Y to ion exchange groups is well known in the art and consists of reaction with an alkaline solution.

The monomer $FSO_2CF_2CF_2OCF=CF_2$ has a density of about 1.65 grams per cubic centimeter and polytetrafluoroethylene has a density of about 2.2 grams per cubic centimeter. A copolymer of this monomer with tetrafluoroethylene would, thus, have a density between the two values.

It has been discovered that certain perhalogenated dispersant have a surprising effect of dispersing the polymers, especially when the polymers are in a finely divided state.

Dispersants suitable for use in the present invention should have the following characteristics:
 a boiling point less than about 110° C.;
 a density of from about 1.55 to about 2.97 grams per cubic centimeter;
 a solubility parameter of from greater than about 7.1 to about 8.2 hildebrands.

It is desirable that the dispersant has a boiling point of from about 30° C. to about 110° C. The ease of removal of the dispersant and the degree of dispersant removal is important in the producing of various films, coatings and the like, without residual dispersant; hence a reasonable boiling point at atmospheric pressure allows convenient handling at room conditions yet effective dispersant removal by atmospheric drying or mild warming.

It is desirable that the dispersant has a density of from about 1.55 to about 2.97 grams per cubic centimeter. The polymers of the present invention have densities on the order of from about 1.55 to about 2.2 grams per cubic centimeter. Primarily, the polymers have densities in the range of from about 1.6 to about 2.2 grams per cubic centimeter. Dispersants of the present invention will therefore swell dissolve and disperse small particles of this polymer, aided by the suspending effects of the similarity in densities.

The prior art did not balance density. They were interested in forming solutions and solutions do not separate.

Solubility parameters are related to the cohesive energy density of compounds. Calculating solubility parameters is discussed in U.S. Pat. No. 4,348,310, the teachings of which are incorporated by reference for the purposes of their teachings on solubility parameters.

It is desirable that the dispersant has a solubility parameter of from greater than about 7.1 to about 8.2 hildebrands. The similarity in cohesive energy densities between the dispersant and the polymer determine the likelihood of dissolving, swelling and dispersing the polymer in the dispersant.

It is preferable that the dispersant has a vapor pressure of up to about 760 millimeters of mercury at the specified temperature limits at the point of dispersant removal. The dispersant should be conveniently removed without the necessity of higher temperatures or reduced pressures involving extended heating such as would be necessary in cases similar to U.S. Pat. No. 3,692,569 or the examples in British Patent 2,066,824A in which low pressures (300 millimeters) had to be employed as well as non-solvents to compensate for the higher boiling points and low vapor pressures of the complex solvents.

It has been found that dispersants represented by the following general formula are particularly preferred provided they also meet the characteristics discussed above (boiling point, density, and solubility parameter):

wherein:
X is selected from the group consisting of F, Cl, Br, and I;
X' is selected from the group consisting of Cl, Br, and I;
Y and Z are independently selected from the group consisting of H, F, Cl, Br, I and R';
R' is selected from the group of perfluoroalkyl radicals and chloroperfluoroalkyl radicals having from 1 to 6 carbon atoms.

The most preferred dispersants are 1,2-dibromotetrafluoroethane (commonly known as Freon 114 B 2)

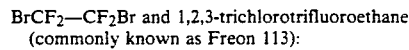

Of these two dispersants, 1,2-dibromotetrafluoroethane is the most preferred dispersant. It has a boiling point of about 47.3° C., a density of about 2.156 grams per cubic centimeter, and a solubility parameter of about 7.2 hildebrands.

1,2-dibromotetrafluoroethane is thought to work particularly well because, though not directly polar, it is highly polarizable. Thus, when 1,2-dibromotetrafluoroethane is associated with a polar molecule, its electron density shifts and causes it to behave as a polar molecule. Yet, when 1,2-dibromotetrafluoroethane is around a non-polar molecule, it behaves as a non-polar dispersant. Thus, 1,2-dibromotetrafluoroethane tends to dissolve the non-polar backbone of polytetrafluoroethylene and also the polar, ion-exchange-containing pendant groups. Its solubility parameter is calculated to be from 7.13 to 7.28 hildebrands.

It is surprising that an off-the-shelf, readily-available compound such as 1,2-dibromotetrafluoroethane would act as a solvent for the fluoropolymers described above. It is even more surprising that 1,2-dibromotetrafluoroethane happens to have a boiling point, a density and a solubility parameter such that it is particularly suitable for use as a solvent/dispersant in the present invention.

In practicing the present invention, the polymer may be in any physical form. However, it is preferably in the form of fine particles to speed dissolution and dispersion of the particles into the dispersant. Preferably, the particle size of the polymers is from about 0.01 microns to about 840 microns. Most preferably, the particle size is less than about 250 microns.

To dissolve and disperse the polymer particles into the dispersant, the polymer particles are placed in contact with the dispersant of choice and intimately mixed. The polymer and the dispersant may be mixed by any of several means including, but not limited to, shaking, stirring, milling or ultra sonic means. Thorough, intimate contact between the polymer and the dispersant are needed for optimum dissolution and dispersion.

The polymers of the present invention are dissolved and dispersed into the dispersants at concentrations ranging from about 0.1 to about 50 weight percent of polymer to dispersant. At concentrations below about 0.1 weight percent, there is insufficient polymer dissolved and dispersed to be effective as a medium for coating of articles or forming films within a reasonable number of repetitive operations. Conversely, at concentrations above about 50 weight percent there is sufficient polymer present as a separate phase such that viable, coherent films and coatings of uniform structure cannot be formed without particulate agglomerates, etc.

Preferably, the concentration of the polymer in the dispersant is from about 0.1 to about 20 weight percent. More preferably, the concentration of the polymer in the dispersant is from about 0.3 to about 10 weight percent. Most preferably, the concentration is from about 5 to about 15 weight percent.

The dispersion of the polymer into the dispersant can be conducted at room temperature conditions. However, the optimum dispersion effects are best achieved at temperatures from about 10° C. to about 50° C. At temperatures above about 50° C. the measures for dissolving and dispersing the polymer have to include pressure confinement for the preferred dispersants or method of condensing the dispersants. Conversely, at temperatures below about 10° C. many of the polymers of the present invention are below their glass transition temperatures thus causing their dispersions to be difficult to form at reasonable conditions of mixing, stirring, or grinding.

The dispersion of the polymers of the present invention into the dispersant are best conducted at atmospheric pressure. However, dispersion effects can be achieved at pressures from about 760 to about 15,000 millimeters mercury or greater. At pressures below about 760 millimeters mercury, the operation of the apparatus presents no advantage in dissolving and dispersing polymers, rather hindering permeation into the polymers and thus preventing forming of the dispersions.

Conversely, pressures above about 760 millimeters mercury aid in dissolving and dispersing polymers very little compared to the difficulty and complexity of the operation. Experiments have shown that at about 20 atmospheres the amount of polymer dissolved and dispersed in the dispersant is not appreciably greater.

After the polymer dispersions of the present invention have been formed, they are fixed to other polymer films or substrates by sintering or compression to fix the polymer from the dispersion to the substrate.

After coating the first dispersion onto the first substrate and coating the second dispersion onto the second substrate, it is possible to contact the dispersions and form them into a fused composite film while maintaining them in contact. The two dispersions, when processed in this manner, will tend to mingle to some extent.

The following methods are suitable for fixing the dispersion of the present invention to a substrate. Dipping the substrate into the dispersion, followed by air drying and sintering at the desired temperature with sufficient repetition to build the desired thickness. Spraying the dispersion onto the substrate is used to advantage for covering large or irregular shapes. Pouring the dispersion onto the substrate is sometimes used. Painting the dispersion with brush or roller has been successfully employed. In addition, coatings may be easily applied with metering bars, knives, or rods. Usually, the coatings or films are built up to the thickness desired by repetitive drying and sintering.

The type of substrate upon which the dispersion of the present invention may be applied can include such things as glass, aluminum foil, polytetrafluoroethylene tape, polytetrafluoroethylene sheets, metal sheets, or other polymer films or objects.

The substrate upon which the dispersion is to be deposited is cleaned or treated in such a way as to assure uniform contact with the dispersion. The substrate can be cleansed by washing with a degreaser or similar solvent followed by drying to remove any dust or oils from objects to be used as substrates. Metals should usually be acid etched, then washed with a solvent to promote adhesion, if desired, unless the metal is new in which case degreasing is sufficient.

After being cleaned, the substrates may be pre-conditioned by heating or vacuum drying prior to contact with the dispersions and the coating operation. Temperatures and pressures in the following ranges are preferably used: about 20 millimeters mercury at about 110° C. or thereabout is sufficient in all cases; however, mild heat is usually adequate, on the order of about 50° C. at atmospheric pressure.

After preparation, the substrates are coated with the dispersion by any of several means including, but not limited to, dipping, spraying, brushing, pouring. Then the dispersion may be evened out using scraping knives, rods, or other suitable means. The dispersion can be applied in a single step or in several steps depending on the concentration of the polymer in the dispersion and the desired thickness of the coating or film.

Following the application of the dispersion, the dispersant is removed by any of several methods including, but not limited to, evaporation or extraction. Extraction is the use of some agent which selectively dissolves or mixes with the dispersant but not the polymer.

These removal means should be employed until a uniform deposition of polymer is obtained and a continuous film is formed.

The dispersant removal is typically carried out by maintaining the coated substrate at temperatures ranging from about 10° C. to about 110° C., with the preferred heating range being from about 20° C. to about 100° C. The heating temperature selected depends upon the boiling point of the dispersant.

Heating temperatures are customarily in the range of from about 20° C. to about 50° C. for 1,2-dibromotetrafluoroethane.

The pressures employed for the removal of the dispersant from the coated substrate can range from about 20 mm mercury to about 760 mm mercury depending on the nature of the dispersant, although pressures are typically in the range of from about 300 mm mercury to about 760 mm mercury for 1,2-dibromotetrafluoroethane.

The forming of the coating or film can be carried out as part of the polymer deposition and dispersant removal process or as a separate step by adjusting the thermal and pressure conditions associated with the separation of the polymer from the dispersant. If the dispersion is laid down in successive steps, a continuous film or coating free from pinholes can be formed without any subsequent heating above ambient temperature by control of the rate of evaporation. This can be done by vapor/liquid equilibrium in a container or an enclosure; therefore, the dispersant removal step can be merely a drying step or a controlled process for forming a coating or film. If the dispersant is removed as by flash evaporation a film will not form without a separate heating step.

After the dispersant has been removed, the residual polymer and substrate, as a separate step, is preferably subjected to a heat source of from about 150° C. to about 380° C. for times ranging from about 10 seconds to about 120 minutes, depending upon the thermoplastic properties of the polymers. The polymers having melt viscosities on the order of $5 \times 10^5$ poise at about 300° C. at a shear rate of 1 sec.$^{-1}$ as measured by a typical capillary rheometer would require the longer times and higher temperatures within the limits of the chemical group stability. Polymers with viscosities on the order of 1 poise at ambient temperatures would require no further treatment.

The most preferred treatment temperatures are from about 270° C. to about 350° C. and a time of from about 0.2 to about 45 minutes for the most preferred polymers for use in the present invention. Such polymers form thin continuous films under the conditions described above.

After two polymers have been applied to their respective substrate, they are contacted with each other at a temperature, at a pressure and for a time sufficient to bond the two polymers together. Such temperatures are usually from about 150° to about 380° C. The pressures suitable pressures up to about 2000 psi. The times are from about 10 seconds to about 120 minutes.

Thereafter, the removable substrates are removed. A variety of means can be used to remove the substrate including chemically etching the substrate away, vaporizing the substrate, dissolving the substrate, peeling the substrate from the film, peeling the film from the substrate, and other physical or chemical means.

Composite films of varying layer thicknesses can be easily produced by the methods and means described above. Such films are suitable as membranes, when in their ionic forms, for use in electrochemical cells. They are particularly useful for the electrolysis of sodium chloride brine solutions to produce chlorine gas and sodium hydroxide solutions. Membranes prepared according to the present invention have surprisingly good current efficiencies when used in chlor-alkali cells.

EXAMPLES

Example 1

A first polymer having an equivalent weight of about 850 was prepared according to the following procedure:

About 784 grams of $CF_2=CFOCF_2CF_2SO_2F$ was added to about 4700 grams of deoxygenated water containing about 25 grams $NH_4O_2CC_7F_{15}$, about 18.9 grams of $Na_2HPO_4.7H_2O$, about 15.6 grams of $NaH_2PO_4.H_2O$ and about 4 grams of $(NH_4)_2S_2O_8$ under a positive pressure of about 192 pounds per square inch gauge (psig) of tetrafluoroethylene at about 60° C. for about 88 minutes. The reactor was vented under heat and vacuum to remove residual monomers. The reactor contents was frozen, thawed, and vigorously washed to remove residual salts and soap.

About 30 grams of the first polymer was made into a dispersion using about 270 grams of 1,2-dibromotetrafluoroethane. The dispersion was coated onto an aluminum foil and heated to about 300° C. for about 1 minute. The coating and heating steps were repeated until a coating about 4 mils (about 102 microns) was achieved.

A second copolymer was then prepared. It was a copolymer of $CF_2=CF_2$ and $CF_2=CFOCF_2CF_2SO_2F$ having an equivalent weight of about 1144 was prepared. The polymer was prepared according to the following procedure. About 784 grams of $CF_2=CFOCF_2CF_2SO_2F$ was added to about 4700 grams of deoxygenated water containing about 25 grams $NH_4O_2CC_7F_{15}$, about 18.9 grams of $Na_2HPO_4.7H_2O$, about 15.6 grams of $NaH_2PO_4.H_2O$ and about 4 grams of $(NH_4)_2S_2O_8$ under a positive pressure of about 250 pounds per square inch gauge (psig) of tetrafluoroethylene at about 60° C. for about 58 minutes. The reactor was vented under heat and vacuum to remove residual monomers. The reactor contents was frozen, thawed, and vigorously washed to remove residual salts and soap. After vacuum drying, a dispersion was prepared by placing 56 grams of polymer prepared above in a laboratory-size single tier 290 revolutions per minute roller Norton Jar Mill with 168 grams of 1,2-dibromotetrafluoroethane. The mixture was mixed in the ball mill overnight at ambient temperature and at atmospheric pressure.

To the resulting soft paste about 300 additional grams of 1,2-dibromotetrafluoroethane was added and the mill was rolled an additional 3 hours. The resulting dispersion was found to contain about 12.5 weight percent polymer. The mixture was coated onto a sheet of aluminum foil approximately 38 microns thick by dipping the foil which had been formed into an envelope or pocket shape into the dispersion. The coated aluminum foil was allowed to air dry. Thus, the dispersant evaporated from the dispersion at ambient temperature.

The aluminum foil coated with the second copolymer was then heated at about 300° C. in a muffle furnace for about 1 minute to fuse the polymer into a more uniform film form.

The resulting thin film was found to be a continuous film and had a thickness of about 0.5 mils (about 12.7 microns).

The dipping and heating process was repeated 5 times until a 2.5 mil (about 63.5 microns) thick second polymer film was built up.

Then the two coated foils above were pressed together, coated side to coated side, at about 300° C. at a pressure of about 400 psig for about 3 minutes. The resulting two layer composite membrane was hydrolyzed in a 25 weight percent aqueous sodium hydroxide solution. It was then run satisfactorily in a chlor-alkali test cell.

We claim:
1. A method for forming polymer composite films using a removal substrate comprising:
   (a) forming a first dispersion of a first perfluorinated polymer containing sites convertible to ion ex- change groups and a dispersant having: a boiling point less than about 110° C.; a density of from about 1.55 to about 2.97 grams per cubic centimeter; and a solubility parameter of from greater than about 7.1 to about 8.2 hildebrands;

(b) depositing the first dispersion onto a first removable substrate;

(c) removing the first dispersant from the first dispersion, thereby forming a first film;

(d) forming a second dispersion of a second perfluorinated polymer containing sites convertible to ion exchange groups and a second dispersant having: a boiling point less than about 110° C.; a density of from about 1.55 to about 2.97 grams per cubic centimeter; and a solubility parameter of from greater than about 7.1 to about 8.2 hildebrands;

(e) depositing the second dispersion onto a second removable substrate;

(f) removing the second dispersant from the second dispersion, thereby forming a second film;

(g) bonding the first film to the second film; and (h) removing the first and the second substrate wherein the first and the second dispersants are independently represented by the general formula:

XCF$_2$—CYZX' wherein:

X is selected from the group consisting of F, Cl, Br, and I;

X' is selected from the group consisting of Cl, Br, and I;

Y and Z are independently selected from the group consisting of H, F, Cl, Br, I and R';

R' is selected from the group of perfluoroalkyl radicals and chloroperfluoroalkyl radicals having from 1 to 6 carbon atoms.

2. The method of claim 1 wherein the first and the second perfluorinated polymers are independently selected from the group of copolymers formed from a first type of monomer and a second type of monomer; wherein the first type of monomer is represented by the general formula:

CF$_2$=CZZ'     (I)

where:

Z and Z' are independently selected from the group consisting of —H, —Cl, —F, or CF$_3$; and the second monomer is represented by the general formula:

Y—(CF$_2$)$_a$—(CFR$_f$)$_b$—(CFR'$_f$)$_c$—O—[CF(CF$_2$X')—CF$_2$—O]$_n$—CF=CF$_2$     (II)

where:

Y is selected from the group consisting of —SO$_2$Z, —CN, —COZ and C(R$^3{}_f$)(R$^4{}_f$)OH;

Z is I, Br, Cl, F, OR, or NR$_1$R$_2$;

R is a branched or linear alkyl radical having from 1 to about 10 carbon atoms or an aryl radical;

R$^3{}_f$ and R$^4{}_f$ are independently selected from the group consisting of perfluoroalkyl radicals having from 1 to about 10 carbon atoms;

R$_1$ and R$_2$ are independently selected from the group consisting of H, a branched or linear alkyl radical having from 1 to about 10 carbon atoms or an aryl radical;

a is 0–6;

b is 0–6;

c is 0 or 1;

provided a+b+c is not equal to 0;

X is Cl, Br, F or mixtures thereof when n>1;

n is 0 to 6; and

R$_f$ and R'$_f$ are independently selected from the group consisting of F, Cl, perfluoroalkyl radicals having from 1 to about 10 carbon atoms and fluorochloroalkyl radicals having from 1 to about 10 carbon atoms.

3. The method of claim 2 wherein the first and the second perfluorinated polymers independently include a third type of monomer wherein the third type of monomer is one or more monomers represented by the general formula:

Y'—(CF$_2$)$_{a'}$—(CFR$_f$)$_{b'}$—(CFR'$_f$)$_{c'}$—O—[CF(CF$_2$X')—CF$_2$—O]$_{n'}$—CF=CF$_2$     (III)

where:

Y' is F, Cl or Br;

a' and b' are independently 0–3;

c' is 0 or 1;

provided a'+b'+c' is not equal to 0;

n' is 0–6;

R$_f$ and R'$_f$ are independently selected from the group consisting of Br, Cl, F, perfluoroalkyl radicals having from about 1 to about 10 carbon atoms, and chloroperfluoroalkyl radicals having from about 1 to about 10 carbon atoms; and X' is F, Cl, Br, or mixtures thereof when n'>1.

4. The method of claim 1 wherein the boiling point of the first and the second dispersant is from about 30° C. to about 110° C.

5. The method of claim 1 wherein the density of the first and the second dispersant is from about 1.55 to about 2.2 grams per cubic centimeter.

6. The method of claim 1 wherein the solubility parameter of the first and second dispersant is from greater than about 7.1 to about 7.5 hildebrands.

7. The method of claim 1 wherein the density of the first and second dispersant and the density of the first and second polymer are both from about 1.55 to about 2.2 grams per cubic centimeter.

8. The method of claim 1 wherein X and X' are Br.

9. The method of claim 1 wherein X and X' are Cl.

10. The method of claim 1 wherein the first and the second polymers are present in the first and the second dispersions at a concentration of from about 0.1 to about 50 weight percent.

11. The method of claim 1 wherein the first and the second polymers are present in the first and the second dispersions at a concentration of from about 0.3 to about 30 weight percent.

12. The method of claim 1 wherein the first and second removable substrates are made of aluminum.

13. The method of claim 1 wherein the first and the second substrates are independently removed by dissolving with a solvent for the substrate.

14. The method of claim 1 wherein the first and the second substrates are individually removed by an alkaline solution.

15. The method of claim 1 including heating the coated first and second substrates to fuse the first and second polymers into films prior to removing the substrate.

* * * * *